(12) United States Patent
Bonazoli

(10) Patent No.: US 6,604,859 B1
(45) Date of Patent: Aug. 12, 2003

(54) BUSHING FOR OIL FILM BEARING

(75) Inventor: Stephen Bonazoli, Worcester, MA (US)

(73) Assignee: Morgan Construction Company, Worcester, MA (US)

( * ) Notice: Subject to any disclaimer, the term of this patent is extended or adjusted under 35 U.S.C. 154(b) by 0 days.

(21) Appl. No.: 10/055,508

(22) Filed: Jan. 23, 2002

(51) Int. Cl.$^7$ ............................ F16C 33/10; F16C 43/02
(52) U.S. Cl. ...................... 384/397; 29/898.02; 384/419
(58) Field of Search ................................. 384/276, 286, 384/289, 397, 398, 416, 418, 419, 428; 492/1; 29/898.02, 898.042

(56) References Cited

U.S. PATENT DOCUMENTS

| | | | |
|---|---|---|---|
| 2,018,055 A | * | 10/1935 | Dahlstrom .................. 384/419 |
| 3,287,072 A | * | 11/1966 | Buske ......................... 384/286 |
| 3,734,580 A | | 5/1973 | Piscitelli |
| 4,023,867 A | | 5/1977 | Piller |
| 4,038,856 A | | 8/1977 | Bayer et al. |
| 4,291,808 A | * | 9/1981 | Roloff ........................ 384/419 |
| 4,748,729 A | | 6/1988 | Rochelmeyer |
| 5,009,522 A | | 4/1991 | Hahn |
| 5,144,828 A | | 9/1992 | Grotepass et al. |
| 5,720,195 A | | 2/1998 | Ruple |

\* cited by examiner

*Primary Examiner*—Thomas R. Hannon
(74) *Attorney, Agent, or Firm*—Samuels Gauthier & Stevens

(57) ABSTRACT

A bushing has a cylindrical wall with an inner bearing surface configured and dimensioned to surround the journal surface of a roll neck in a rolling mill. The bearing surface has a primary recess into which oil is admitted to serve as a lubricant between the journal and bearing surfaces. The primary recess has a width measured between circumferentially spaced edges, and a length spaced from the ends of the bearing surface by land segments of the bearing surface. Secondary recesses in the land segments have widths that are narrower than the width of the primary recess.

8 Claims, 2 Drawing Sheets

BUSHING FOR OIL FILM BEARING

BACKGROUND OF THE INVENTION

1. Field of the Invention

This invention relates generally to oil film bearings of the type employed in rolling mills to rotatably support the journal surfaces of roll necks, and is concerned in particular with a novel and improved bushing that allows the bearings to remain mounted on and to serve as stable support platforms for the roll necks when the roll surfaces are being reground.

2. Description of the Prior Art

In the past, the prevailing practice has been to dismantle the oil film bearings from the roll necks prior to machining the roll surfaces. The exposed roll necks are then rotatably supported in fixtures specially designed to provide the extremely rigid bearing characteristics required for machining accuracy. During the time that the rolls are being machined and subsequently inventoried, the dismantled oil film bearings are remounted on spare rolls for reuse in the mill. To some extent, this practice is advantageous in that it results in a savings in capital investment which would otherwise be required if all rolls, including spare or replacement rolls, were to be provided with their own bearings. This advantage must, however, be viewed in the light of several disadvantages such as for example the time and effort expended by maintenance personnel in dismantling, removing and remounting the bearings, the possibility of the disassembled bearing components being damaged or contaminated with foreign matter, and the fact that the roll surfaces are not machined precisely concentrically with the bearings which will support them in the mill.

In order to obviate the above-mentioned disadvantages, an alternative practice has sometimes been adopted where the rolls are provided with their own sets of bearings that remain mounted on the roll necks while the rolls are in use in the mill and also while a machining operation is being performed on the rolls. This alternative practice has been found to be generally satisfactory, except for the fact that conventional oil film bearings are designed primarily for high-speed heavy-duty operations, and as such do not provide bearing characteristics at the low-speed low-load conditions of a machining operation that are as rigid and stable as the specially designed fixtures employed in the aforementioned prevailing practice. Thus, machining accuracy can be compromised.

SUMMARY OF THE INVENTION

In accordance with the present invention, the interior surface of the bearing's bushing is provided with secondary recesses positioned adjacent to the primary recesses or "rebores" into which oil is admitted to serve as a lubricant between the journal and bearing surfaces. The secondary recesses are narrower than the primary recesses, with both the primary and secondary recesses preferably being concave.

During a roll machining operation, the bearings and their respective chocks remain on the roll necks and are mounted in an appropriately designed support structure, with the bearings orientated to rotatably support the journal surfaces of the roll necks on the side edges of the bushing's secondary recesses. These side edges provide the rigid stable platform needed to achieve machining accuracy.

When the rolls are returned to service, the bearings are orientated such that the primary recesses operate in a conventional manner to introduce lubricant to the bearings load zones, with the edges of the secondary recesses no longer serving as supports.

These and other features and advantages of the present invention will now be described in further detail with reference to the accompanying drawings, wherein:

DETAILED DESCRIPTION OF PREFERRED EMBODIMENT

Figure 1:
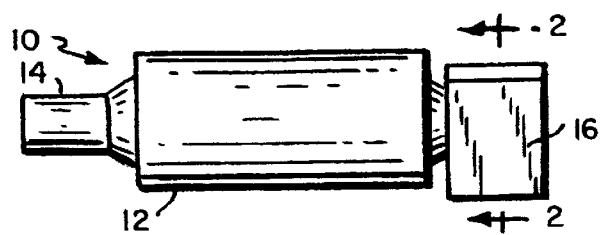
FIG. 1 is a side view of a conventional roll of the type employed in a rolling mill, e g., a hot strip mill, with one of the roll necks being exposed, and with the other roll neck received in an oil film bearing.

With reference initially to FIG. 1, a typical rolling mill roll is shown at 10. The roll includes a large diameter roll barrel 12 with reduced diameter necks 14 projecting axially from opposite ends. In FIG. 1, one of the roll necks is exposed and the other is contained in an oil film bearing 16. Rolls of this type are typically employed as backup rolls in the 4-Hi stands of hot strip mills and cold rolling mills.

Figure 2:
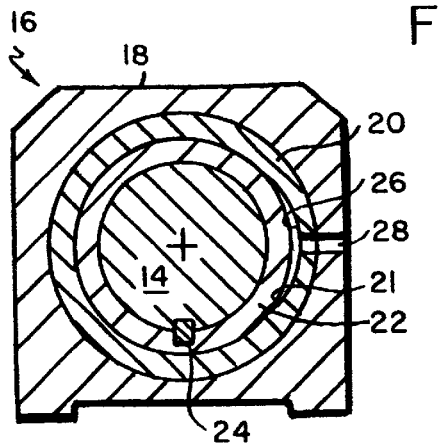
FIG. 2 is a schematic enlarged sectional view taken along line 2—2 of FIG. 1.

With reference to FIG. 2, it will be seen that the oil film bearings 16 typically include as basic components a chock 18 containing a fixed bushing 20. The bushing comprises a cylindrical wall with an inner bearing surface 21 configured and dimensioned to surround the exterior journal surface of a sleeve 22. The sleeve is received on and rotatably fixed with respect to the roll neck 14 by means of a key 24 or the like.

The inner bearing surface 21 of the bushing is provided with a primary recess 26 (commonly referred to as a "rebore"). Oil is admitted to the primary recess via aligned passageways 28 in the bushing and chock. The oil serves as lubricant between the inner bearing surface of the bushing and the outer journal surface of the sleeve.

Figure 4:
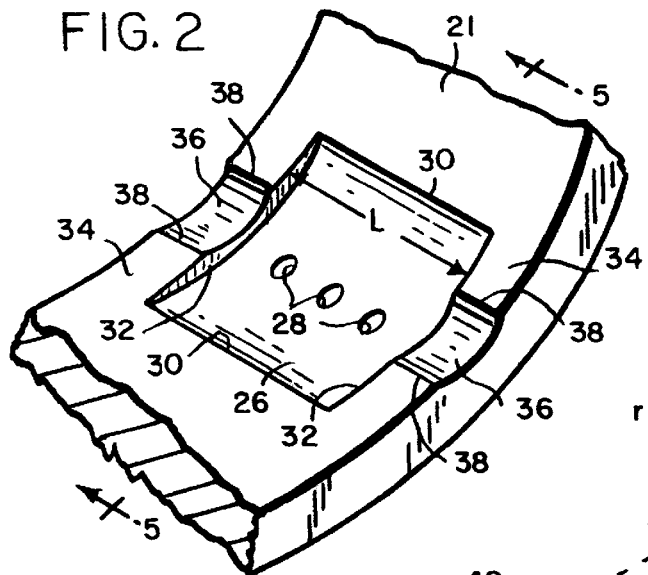
FIG. 4 is a partial perspective view of the interior of a bushing in accordance with the present invention, showing secondary recesses adjacent to the primary recess which serves to admit lubricant to the bearing load zone.
Figure 5:
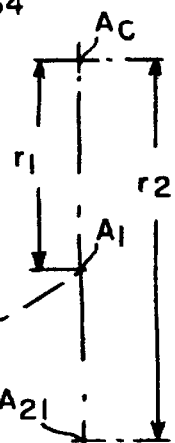
FIG. 5 is a sectional view on an enlarged scale taken alone lines 5—5 of FIG. 4.
Figure 5:
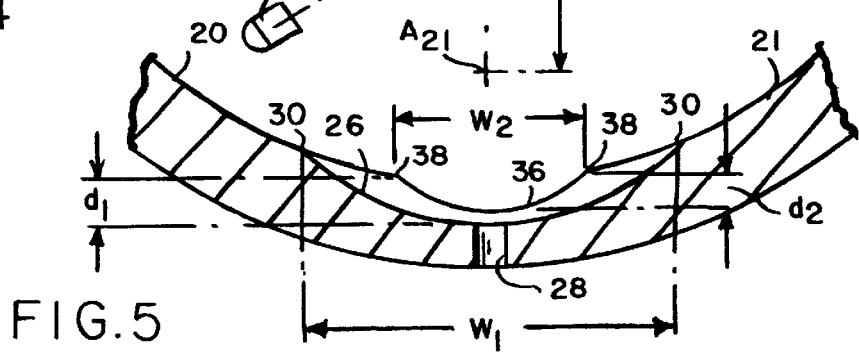

As can best be seen in FIGS. 4 and 5, the primary recess 26 has a first width $W_1$ measured between circumferentially spaced first edges 30 and a length L measured-between axially spaced ends 32. The ends 32 of the primary recess are spaced from the ends of the bearing surface 21 by land segments 34 of the bearing surface.

Secondary recesses 36 are formed in the land segments 34. Each secondary recess extends from a respective end 32 of the primary recess 26 to an adjacent end of the bearing surface 21. The secondary recesses have second widths $W_2$ measured between circumferentially spaced second edges 38. The second widths $W_2$ are narrower than the first width $W_1$, with $W_2$ preferably being between about 0.3 to 0.6 of $W_1$.

The maximum depths $d_2$ of the secondary recesses 36 are less than the maximum depth $d_1$ of the primary recess 26, with $d_2$ preferably being between about 0.2 to 0.4 of $d_1$.

The primary and secondary recesses 26, 36 are preferably concave.

It will be seen from FIG. 5 that the primary recess 26 may be machined into the bearing surface 21 of the bushing by rotating a tool 40 about a first axis $A_1$ offset from the central axis $A_C$ of the cylindrical wall of the bushing by a first radial distance $r_1$. The secondary recesses 36 may be machined in a like manner by rotating the tool 40 about a second axis $A_2$ offset from the central axis $A_C$ by a second radial distance $r_2$. The first and second axes $A_1$, $A_2$ are located on a common radius extending from the central axis $A_C$, with the first radial distance $r_1$, being smaller than the second radial distance $r_2$.

Figure 3:
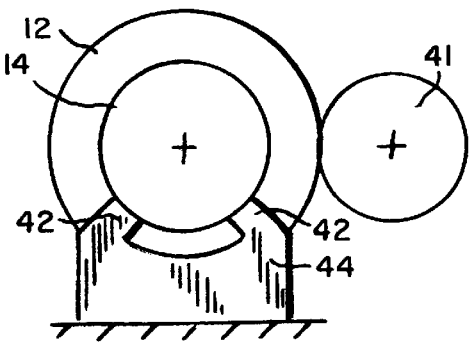
FIG. 3 is another schematic view depicting a typical fixture used to support the roll necks during a roll machining operation.

FIG. 3 depicts the prevailing practice when machining the roll barrels 14 with, for example, a grinding wheel 41. The bearings are removed entirely from the roll, and the roll 20 necks 14 are supported on the pads 42 of specially designed fixtures 44. The drawbacks associated this practice have been described previously.

Figure 6:
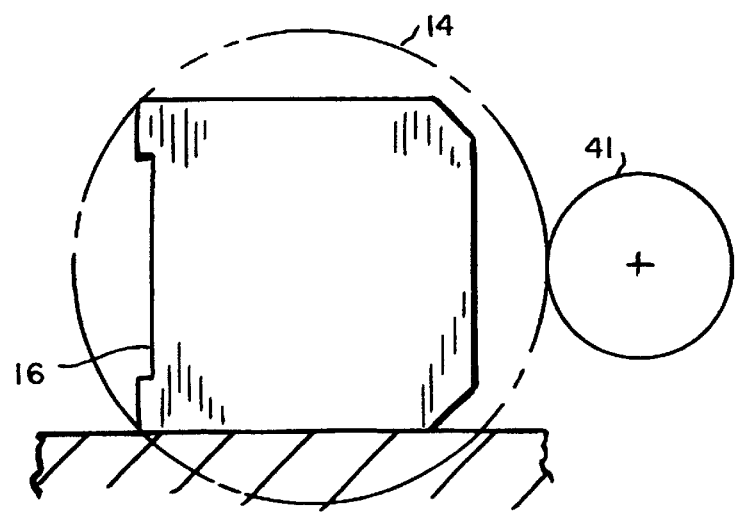
FIG. 6 schematically depicts a roll machining operation where the roll necks remain supported in oil film bearings incorporating bushings in accordance with the present invention.
Figure 7:
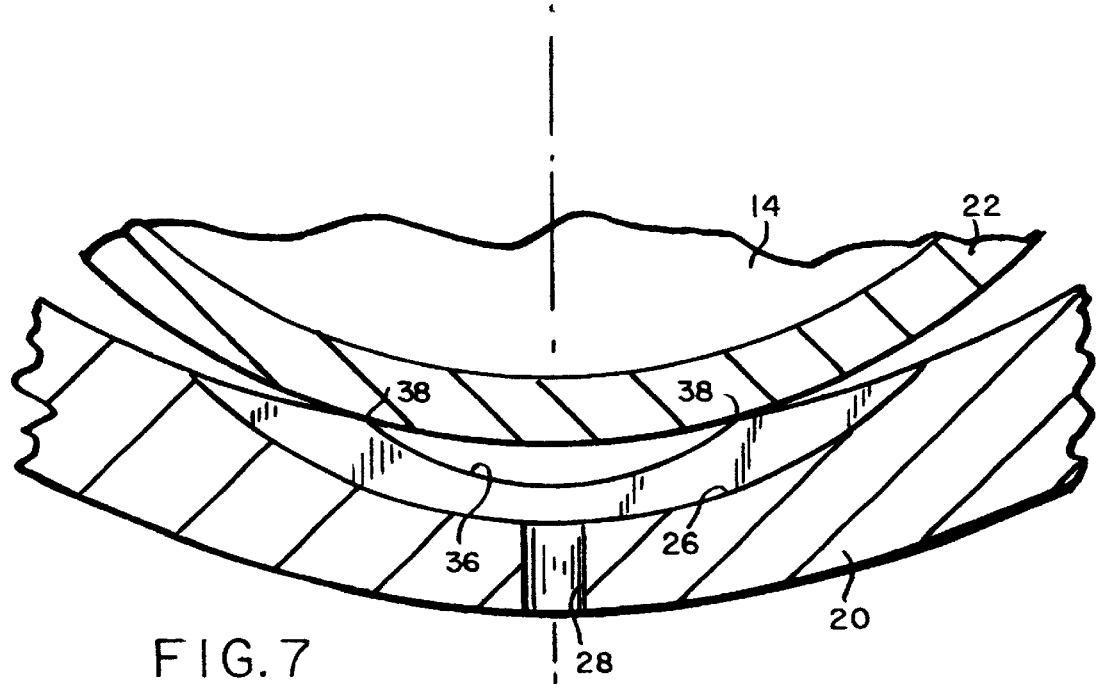
FIG. 7 is an enlarged partial 'sectional view showing the sleeve, which provides the journal surface of the roll neck, supported on the edges of the secondary recesses, when the bearing is positioned as shown in FIG. 6.

FIG. 6 depicts a roll machining operation wherein bearings 16 incorporating bushings in accordance with the present invention remain in place on the roll necks. The bearings are orientated to position the primary and secondary recesses 26, 36 below the roll neck. As can best be seen in FIG. 7, the exterior journal surface of the sleeve 22 is thus received in the primary recess 26 and is rigidly carried on the edges 38 of the secondary recesses 36. The edges 38 thus provide a reliable platform equivalent to that provided by the pads 42 of conventional fixtures. This benefit is obtained without having to strip the bearings from the roll necks.

By maintaining the depths and widths of the secondary recesses 36 within the ranges specified above, the oil supply function of the primary recess 26 is not materially compromised, and by following the above-described machining procedures, manufacturing costs are also not significantly impacted.

I claim:

1. A bushing for rotatably supporting the journal surface of a roll neck in a rolling mill, said bushing comprising:

a cylindrical wall having an inner bearing surface configured and dimensioned to surround said journal surface;

a primary recess in said bearing surface into which oil is admitted to serve as a lubricant between said journal and bearing surfaces, said primary recess having a first width measured between circumferentially spaced first edges and a length measured between axially spaced ends, the ends of said primary recess being spaced from the ends of said bearing surface by land segments of said bearing surface; and secondary recesses in said land segments, each of said secondary recesses extending from a respective end of said primary recess to an adjacent end of said bearing surface, said secondary recesses having second widths measured between circumferentially spaced second edges with said second widths being narrower than said first width.

2. The bushing of claim 1 wherein said primary and secondary recesses are concave.

3. The bushing of claim 2 wherein the maximum depths of said secondary recesses are less than the maximum depth of said first recess.

4. The bushing of claim 2 wherein the maximum depths of said secondary recesses are between about 0.2 to 0.4 of the maximum depth of said primary recess.

5. The bushing according to any one of the preceding claims wherein said second widths are between about 0.3 to 0.6 of said first width.

6. A method of manufacturing a bushing for use in rotatably supporting the journal surface of a roll neck in a rolling mill, said method comprising:

providing a cylindrical wall having an inner bearing surface configured and dimensioned to surround said journal surface;

machining a primary concave recess into said bearing surface by rotating a tool about a first axis offset from the central axis of said wall by a first radial distance, said primary recess being adapted to receive oil serving as a lubricant between said journal and bearing surfaces, said primary recess having a first width measured between circumferentially spaced first edges and having a length measured between axially spaced ends, with the axially spaced ends of said first recess being spaced from the ends of said bearing surface by land segments of said bearing surface; and machining secondary concave recesses into said land segments by rotating a tool about a second axis offset from the central axis of said wall by a second radial distance, each of said second recesses extending from a respective end of said primary recess to an adjacent end of said bearing surface, said secondary recesses having second widths measured between circumferentially spaced second edges with said second widths being narrower than said first width.

7. The method of claim 6 wherein said first and second axes are located along a common radius extending from the central axis of said wall.

8. The method of claim 7 wherein said first radial distance is smaller than said second radial distance.

* * * * *